United States Patent
Sandoval

(10) Patent No.: US 8,382,387 B1
(45) Date of Patent: Feb. 26, 2013

(54) COBRA HEAD STREETLIGHT FIXTURE SURVEILLANCE SYSTEM

(76) Inventor: Shaun C. Sandoval, Larkspur, CO (US)

( * ) Notice: Subject to any disclaimer, the term of this patent is extended or adjusted under 35 U.S.C. 154(b) by 0 days.

(21) Appl. No.: 13/356,587

(22) Filed: Jan. 23, 2012

Related U.S. Application Data

(60) Provisional application No. 61/435,222, filed on Jan. 21, 2011.

(51) Int. Cl.
G03B 17/00 (2006.01)
G03B 29/00 (2006.01)

(52) U.S. Cl. ........ 396/427; 396/433; 348/143; 348/151; 362/253; 362/457

(58) Field of Classification Search .................. 396/427, 396/419, 433; 348/143, 151; 362/253, 374, 362/431, 457
See application file for complete search history.

(56) References Cited

U.S. PATENT DOCUMENTS

| | | | | | |
|---|---|---|---|---|---|
| 3,065,338 | A | * | 11/1962 | Husby et al. | 362/306 |
| 3,299,263 | A | * | 1/1967 | Bjontegard | 362/220 |
| 4,673,609 | A | * | 6/1987 | Hill | 428/187 |
| 5,886,738 | A | * | 3/1999 | Hollenbeck et al. | 348/151 |
| 6,259,476 | B1 | * | 7/2001 | Greene | 348/151 |
| 6,507,413 | B1 | * | 1/2003 | Mueller et al. | 358/1.9 |
| 6,624,845 | B2 | * | 9/2003 | Loyd et al. | 348/151 |
| 7,286,289 | B2 | * | 10/2007 | Bengoechea et al. | 396/433 |
| 2011/0134239 | A1 | * | 6/2011 | Vadai et al. | 348/143 |
| 2011/0141727 | A1 | * | 6/2011 | Kim | 362/234 |

* cited by examiner

Primary Examiner — Christopher Mahoney
(74) Attorney, Agent, or Firm — Ramon L. Pizarro; Edwin H. Crabtree

(57) ABSTRACT

A system and method for providing a surveillance camera platform, and house supporting devices in a streetlight housing is disclosed. The device and method uses a cobra head, clamshell style streetlight housings with a lens between the housing sections to increase the volume of the housing. The system uses a lens for capturing image with the camera systems. The camera systems include data transmittal and receiving devices that allow the receipt of data to control the camera systems and the transmission of any necessary image and other data collected with systems contained within the housing. The lens is camouflaged by using a color that matches the rest of the housing. LEDs and reflector are used to provide the lighting function of the streetlight and to further provide space wile reducing heat within the housing. An internal fan is contemplated to further cool the system.

4 Claims, 9 Drawing Sheets

COBRA HEAD STREETLIGHT FIXTURE SURVEILLANCE SYSTEM

REFERENCE TO RELATED APPLICATIONS

This application claims the benefit of my provisional application having Ser. No. 61/435,222, filed Jan. 21, 2011, now abandoned

FIELD OF THE INVENTION

The present invention relates to a system and method for providing a camera housing, mounting platforms, supporting devices, and power transformer in a streetlight housing. More particularly, but not by way of limitation, to a camera housing for the supporting at least one surveillance camera or equipment by redesigning the internal and external structure of existing cobra head style streetlight into a surveillance system that replaces the existing streetlight and converts the existing power to the power required to operate the camera system.

BACKGROUND OF THE INVENTION

"Cobra" style streetlights have been quite popular for decades. One of the earliest and best-known versions of these streetlights is the device disclosed in U.S. Pat. No. 3,065,338, issued on Nov. 20, 1962 to Donald E. Husby et al, incorporated herein in its entirety by reference. Another well-known cobra-style streetlight is disclosed in U.S. Pat. No. 3,299,263, issued on Jan. 17, 1967 to Arthur M. Bjontegard, and also incorporated herein in its entirety by reference. The popularity of these cobra-style streetlights has made them nearly ubiquitous throughout American cities. The common use of the cobra-style streetlight has made the appearance of these lights something that rarely draws the attention of passer-bys.

The fact that that cobra-style streetlights are largely ignored due to their common occurrence, and the fact that these lights are typically installed far over the sidewalks, where they are difficult to reach by passer-bys makes them the ideal platform for mounting surveillance cameras. The fact that they are high above the sidewalks provides an excellent vantage point, away from the reach of those who would be interested in tampering with a surveillance device.

However, a significant problem associated with using streetlights as a platform for mounting surveillance equipment is that mounting the surveillance equipment directly against the external surfaces of the streetlights makes the surveillance equipment highly visible to passer-bys, and thus making it very easy for individuals to avoid being in a location where they may be observed with the use of the surveillance equipment.

Surveillance cameras are currently attached to power poles and similar structures by use of various housings. However, the prominence of the location of these devices makes them easy to recognized by the individual or individuals that are under surveillance, making the installations ineffective.

A solution to the problem of concealing the surveillance equipment would be using a faux cobra-style streetlight housing, which would conceal the surveillance equipment, but the fact that it would be inoperative would draw attention to the fixture. Additionally, the lack of lighting would make it difficult to capture clear images.

Another solution would be to create a lighting fixture that is designed to contain surveillance equipment, which would provide the needed space for the camera, power supply, and communication equipment. If the problem designing a new lighting fixture with a housing that can provide all the space needed contain all the components needed for an effective surveillance system did not include the restraint that the lighting fixture be of a limited or pre-established size or shape, then the solution would be rather easy: simply make a larger enclosure. However, an effective system requires at least a suitable power supply to provide the voltage used by the surveillance equipment, a wireless modem system to transmit the images, and a camera, preferably a motorized camera with panning, tilt, zoom, and remote control capabilities.

Still further, changing a single light fixture with a large housing along a street with numerous light fixtures of a smaller or sleeker cobra-style is highly likely to attract the attention and suspicion of passer-bys. Changing all light fixtures to avoid the problem of having a single light that looks out of place is a solution that is prohibitively expensive and wasteful.

Accordingly, there remains a need for a simple, reliable approach at incorporating all of the systems needed for an effective surveillance system into a cobra-style streetlight, and thus providing such a surveillance system without having to re-design and replace the entire light fixture with a fixture having a significantly different appearance. The disclosed invention uses much of a well-known, widely available lighting fixture, and uses that as the basis for creating a lighting fixture that provides covert surveillance capabilities.

SUMMARY OF THE INVENTION

It has been discovered that providing a camera based surveillance system that is integrated into existing streetlights can solve the problems left unanswered by known prior art.

The surveillance camera housing includes: an additional camera cover camouflaged lens that is integrated with the existing streetlight housing to provide extra space within the housing.

According to a preferred embodiment of the invention an integral, camouflaged lens is used with LED (light emitting diode) lights that replace the existing light source, mounting bracket, camera or other surveillance equipment, and appropriate wiring.

According to the disclosed system and method an existing cobra-style streetlight is modified to accept a custom camouflaged lens, LED lights, camera and associated equipment, mounting bases, and power supplies. The housing includes a clam type cobra-style streetlight enclosure with at least one window or light-diffusing camouflaged lens. Additionally, the housing incorporating the disclosed invention will contain a wireless, Wi-Fi, DSL, or any other modem or transeciving device, camera, and cabling to connect the devices. Variations will include power transformers or other needed devices including but not limited to reset devices, data routers, antennas, night vision equipment, receiving and transmission devices.

A custom camouflaged lens has been designed that fits into the area between the upper portion of the housing and the pivoting bottom portion of the enclosure. This camouflaged lens is designed to allow a surveillance device to operate from the opening. The lens is referred to here as being "camouflaged" in that it is contemplated that it will be colored or shaped in a manner that it will blend with the rest of the enclosure. This blending may be by color, such as by tinting or coating, or by shape.

Additionally, the disclosed invention will serve to house a camera to view a wide arch from the vantage point of the streetlight is held within the original cobra-style housing. The camouflaged lens is designed not only to fill the void but, flex in a specific way to follow the natural curves of the housing.

The design of the camouflaged lens acts as a weather resistant barrier for the device. This camouflaged lens is either made from a tinted material or covered by a camouflaged or concealing coating that closely matches the color of the device. More particularly, but not by way of limitation, this camouflaged can be micro perforated material or materials that present an opaque appearance when viewed from one side, and a transparent appearance when viewed from another side. These types of materials are described in detail in U.S. Pat. Nos. 6,507,413 to Douglas C. Sundet, incorporated herein in its entirety by reference, and 4,673,609 to George R. Hill, also incorporated herein in its entirety by reference.

It is also contemplated that only a portion or portions of the lens will be transparent or translucent, allowing the camera or cameras housed with the disclosed invention to capture images through the camouflaged lens. These transparent or translucent portions may be coated with micro perforated material, or may be made of a tinted transparent or translucent material, the tinting being preferably of a gray color to match the rest of the housing of the lighting fixture.

According to an embodiment of the invention, the existing light source used in the cobra-style lighting fixture is modified to accept high-powered LED light modules. This alleviates the issue of heat caused by the original light source. The additional space provided by the redesigned light source enclosure allows for the installation of a camera or other devices.

Custom mounting brackets for the camera and additional platforms for other equipment are integrated into the existing connection points of the cobra-style head enclosure.

The "Cobra-Cam" enclosure created with the methods and structure disclosed here can house all of the necessary devices needed for creating an effective surveillance platform. More particularly, but not by way of limitation, a Camera, modem, power supplies, and appropriate wiring are installed to complete a surveillance system.

It will be understood that the disclosed invention allows a user to mount a surveillance camera from a light pole, utility pole, or any structure a streetlight could be attached. The existing streetlight is removed; the Cobra-Cam system is installed. To the casual observer the Cobra-Cam appears to be a standard streetlight. The covert and unique design is evident to the trained eye. The power to operate the system is tapped directly from the streetlight's existing power supply. The power is then used to supply power at the correct voltage and current (AC/DC) via a power transformer or transformers to operate the equipment. Important advantages of the disclosed system include:

- The Cobra-Cam greatly reduces the amount of time that is needed to deploy the surveillance equipment. This is advantageous due to the labor savings and the less time deploying a covert device the less likely the agent will be detected or suspicion of the fact that the equipment is concealing surveillance devices;
- The cobra-Cam blends into its environment by looking similar to the streetlight it replaces. This device does not interfere with the operation of the equipment it is attached to; and
- The Cobra-Cam uses existing infrastructure reducing the cost and time to deploy camera systems.

Thus, a preferred embodiment of the disclosed invention relates to a camera housing adapted to replicating existing streetlights and more particularly, but not by way of limitation, a camera system that replaces existing cobra style streetlights for the purpose of information gathering.

The Cobra-Cam provides a new and improved method to deploy a covert or overt surveillance system in an environment where cameras are not common. The unique design by way of modifying existing infrastructure optimizes the chance of a covert installation and reduces the chance of the device being detected. The Cobra-Cam replaces the existing streetlight head. It uses the same power the standard streetlight utilizes. This alleviates the need to tap power from high amperage or voltage lines. The Cobra-Cam system makes it possible to deploy the camera system in a very short amount of time without damaging or disrupting the functionality of the existing Street light or other similar device. Furthermore it is common for utility workers to perform maintenance or replace streetlights as they burn out or it becomes necessary to maintain them.

DRAWINGS

The accompanying drawings illustrate preferred embodiments of the present invention according to the best mode presently devised for making and using the instant invention, and in which.

Figure 4:
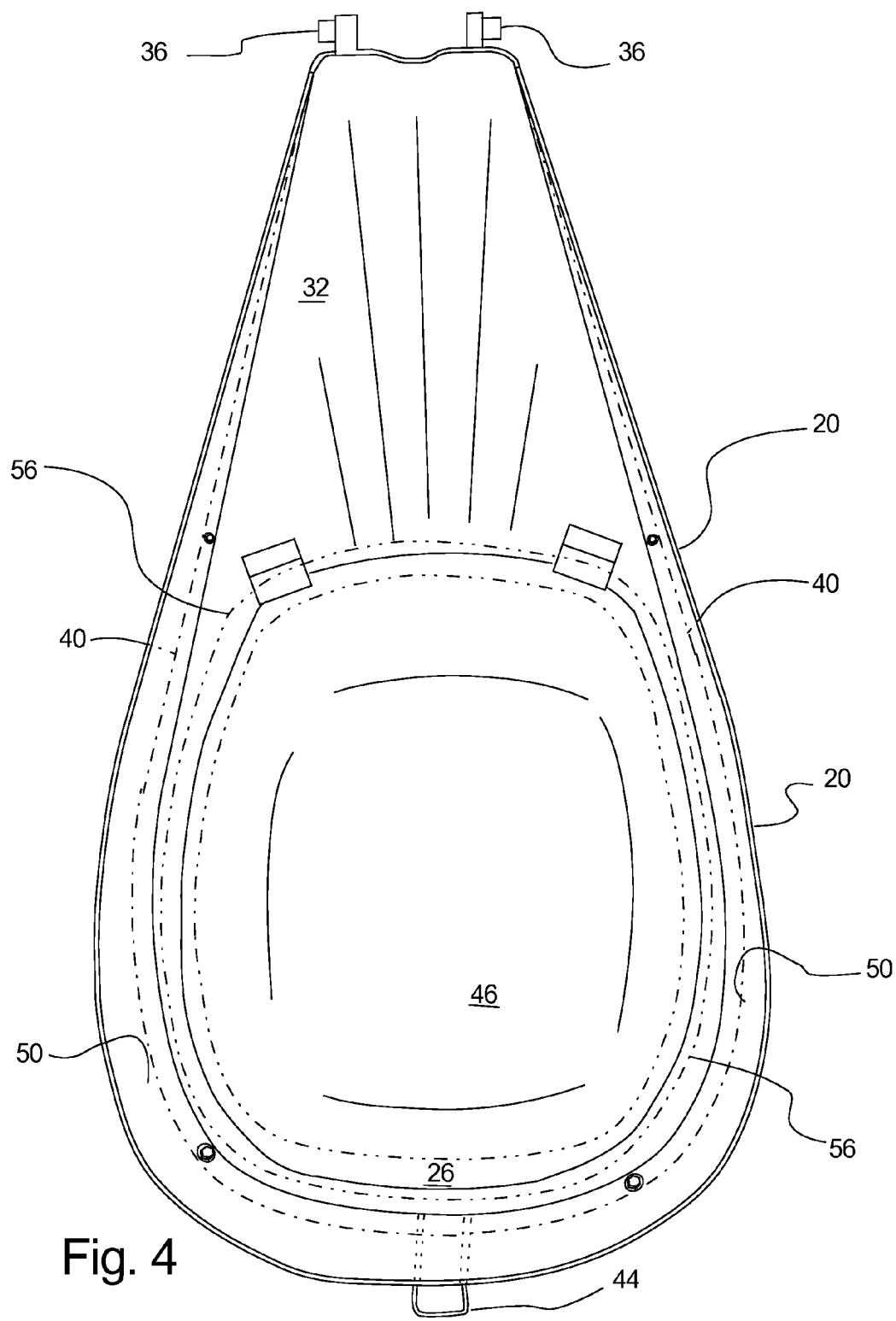

FIG. 4 is a view looking down at the lower housing, and shows the routing of the camouflaged lens, and how the generally extended asymmetrical mandorla, or almond, shape transitions from the narrow ends to the wider central portion in order to fill the gap created between the upper concave housing and the lower concave housing when the lower concave housing is rotated about its hinged connection with the upper concave housing to create space within the streetlight housing for the camera and its associated components.

Figure 5:
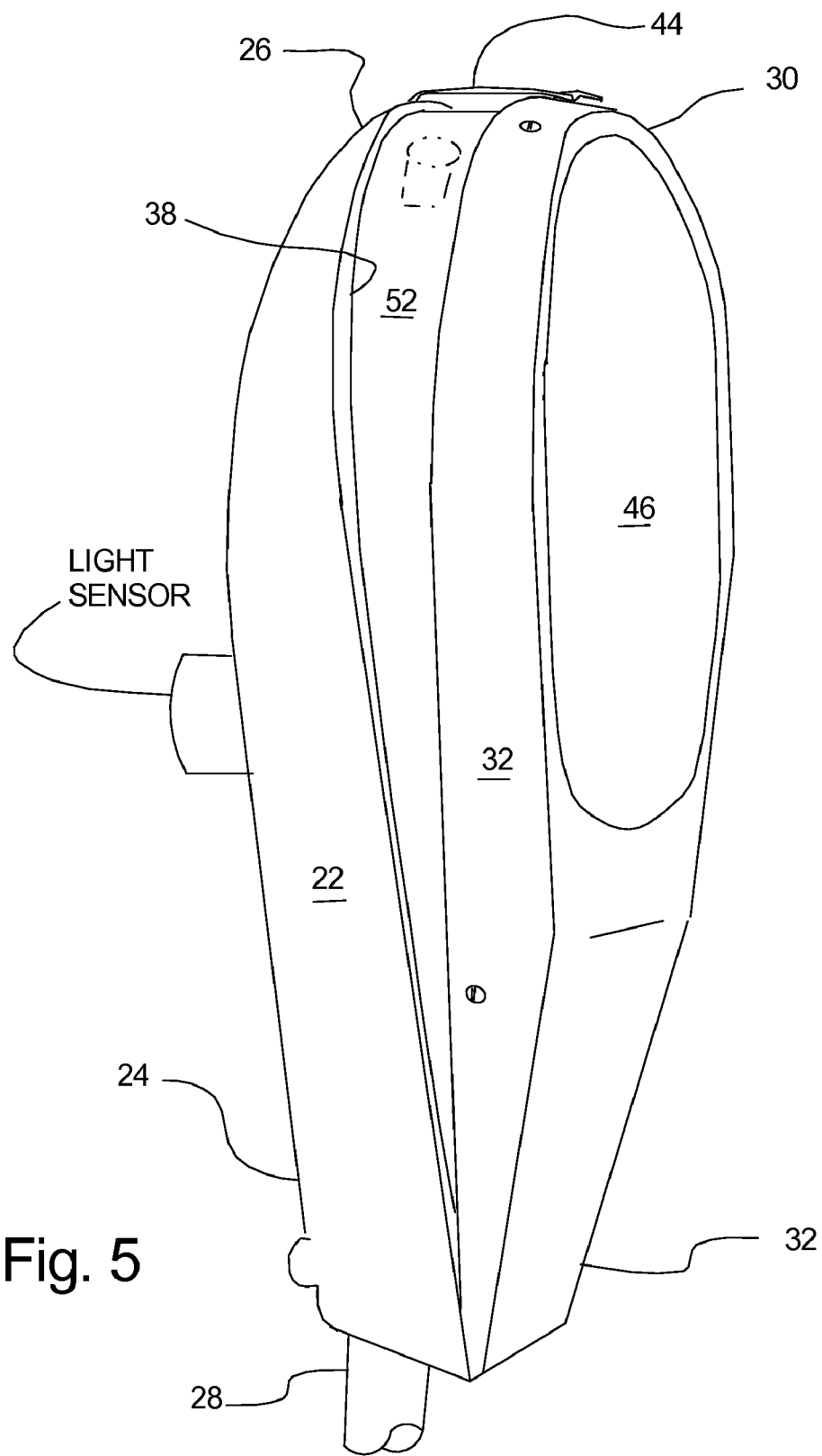

FIG. 5 illustrates the use of the disclosed invention with a streetlight housing that uses a generally flat light lens.

Figure 6:
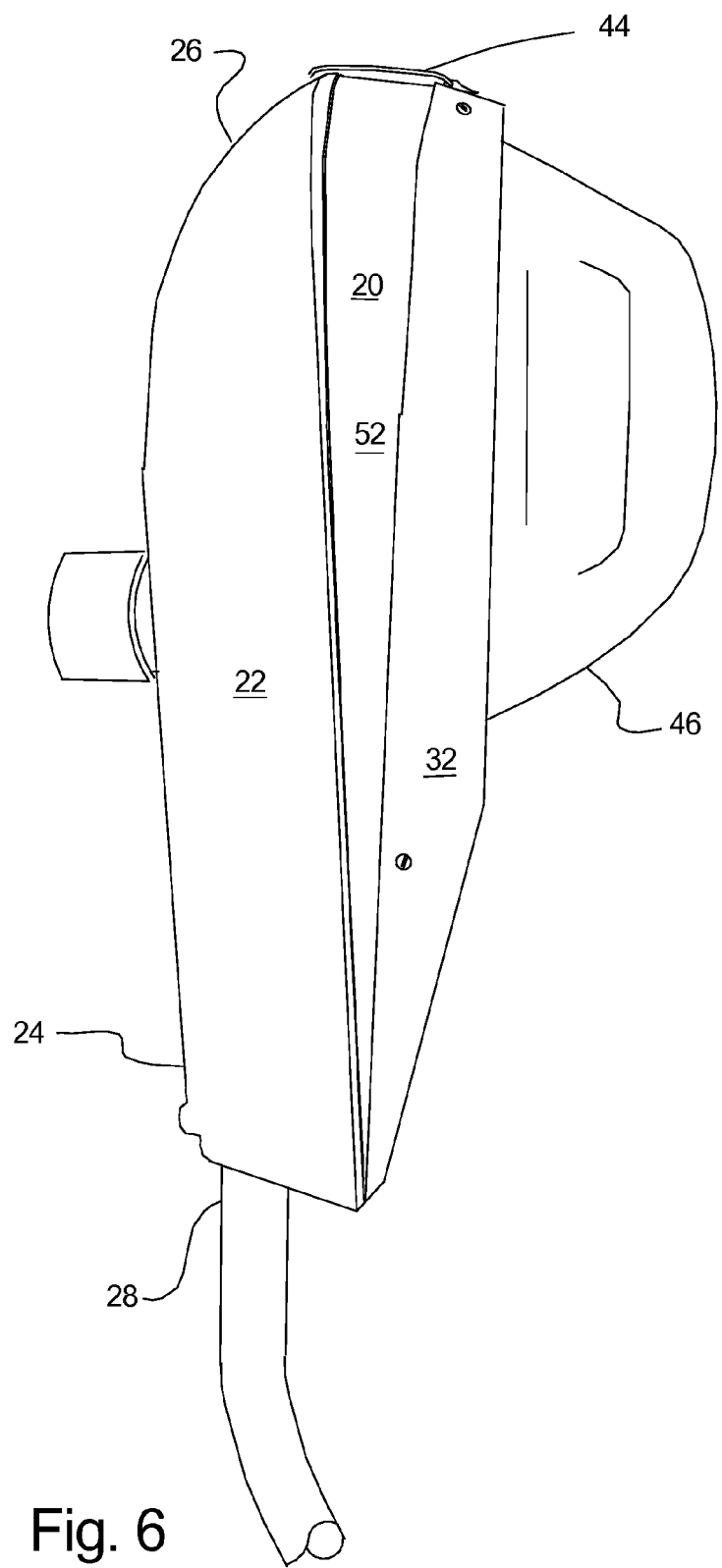

FIG. 6. illustrates the use of the disclosed invention with a streetlight housing that uses a "bubble" type light lens.

Figure 7:
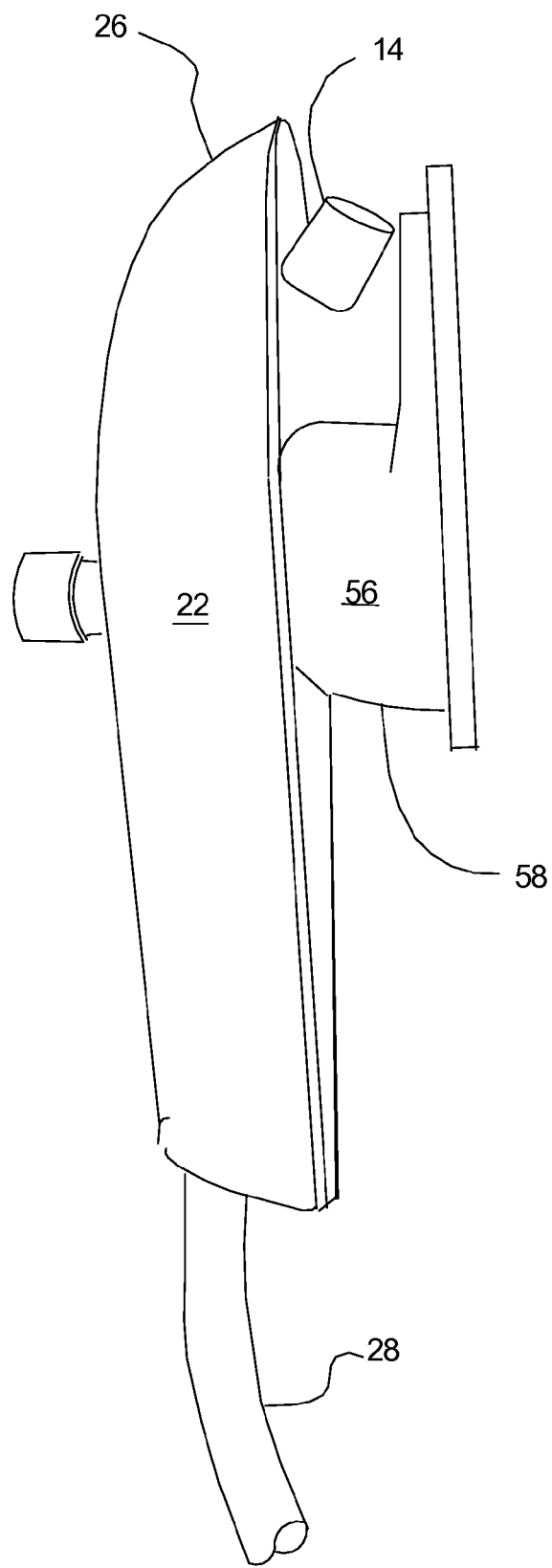

FIG. 7. is a side view of the disclosed invention with an adaptor housing for LED lights, and the camera positioned between the adaptor housing and the second end of the upper concave housing. As can be understood from this figure, the camera or cameras used with the system may be mounted from the adaptor housing, the upper concave housing, or any other suitable structure.

Figure 8A:
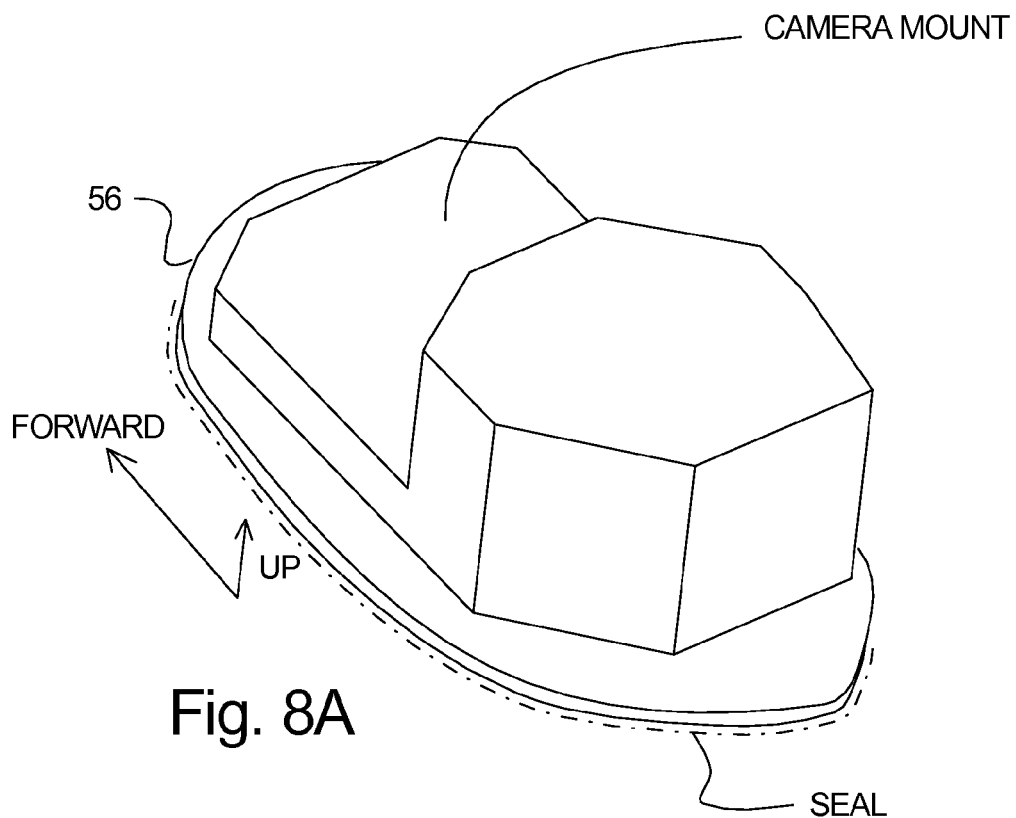

FIG. 8A. illustrates an adaptor housing used with the disclosed invention, the adaptor housing serving to replace the original light bulb used with the housing.

Figure 8B:
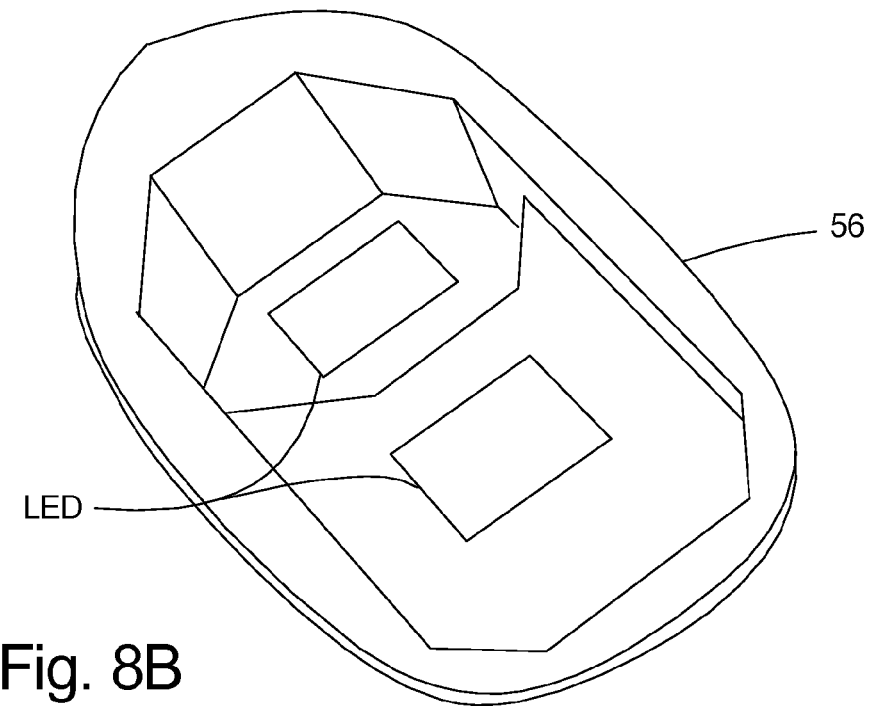

FIG. 8B. illustrates another view of the adaptor housing.

Figure 9:
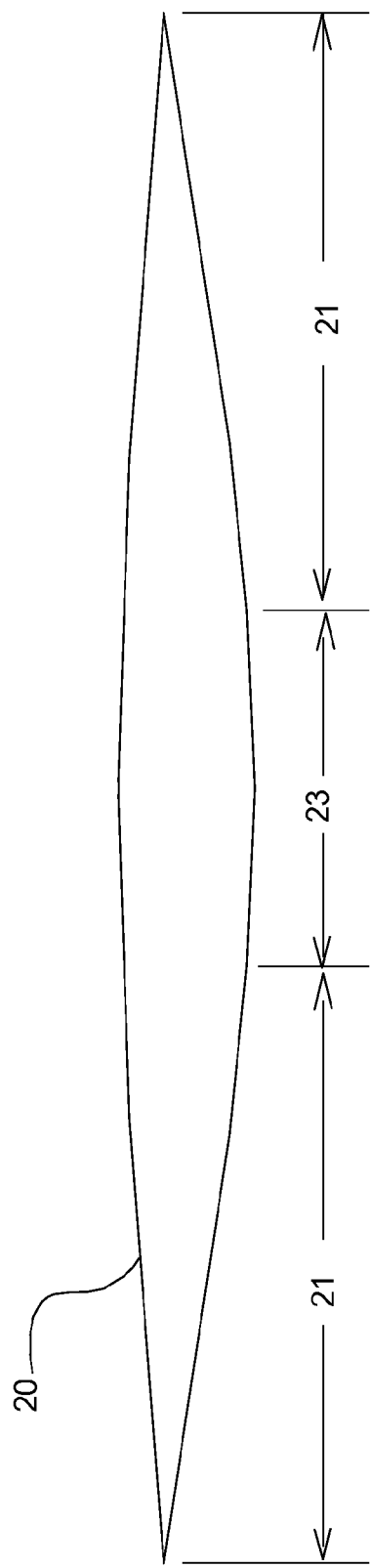

FIG. 9 illustrates a flat pattern of an example of the mandorla (generally almond shaped) shaped lens, and illustrates areas that may be entirely opaque.

DETAILED DESCRIPTION

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
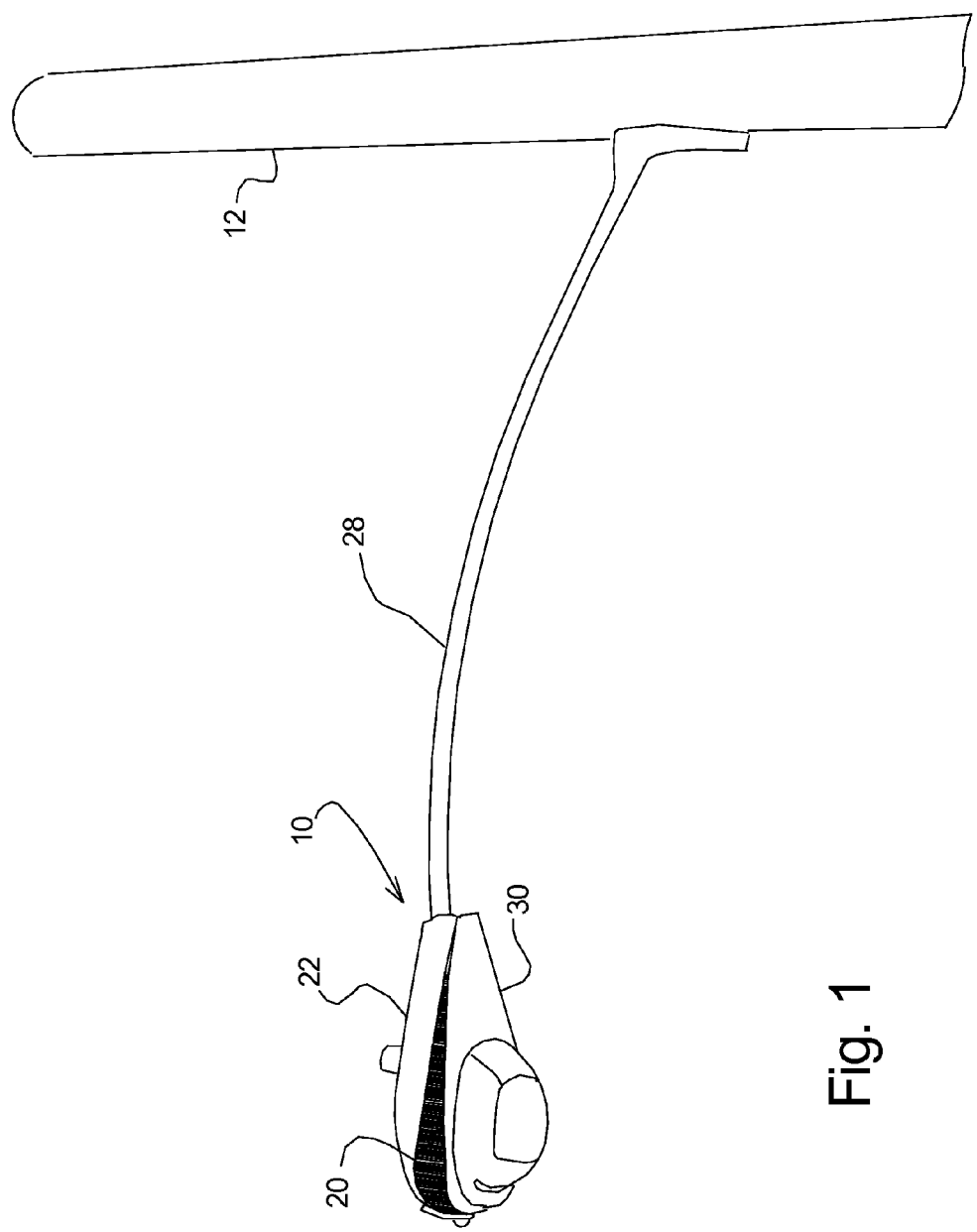
FIG. 1 illustrates a cobra-style lighting fixture incorporating the disclosed invention while mounted from a telephone pole through a support pole.
Figure 3:
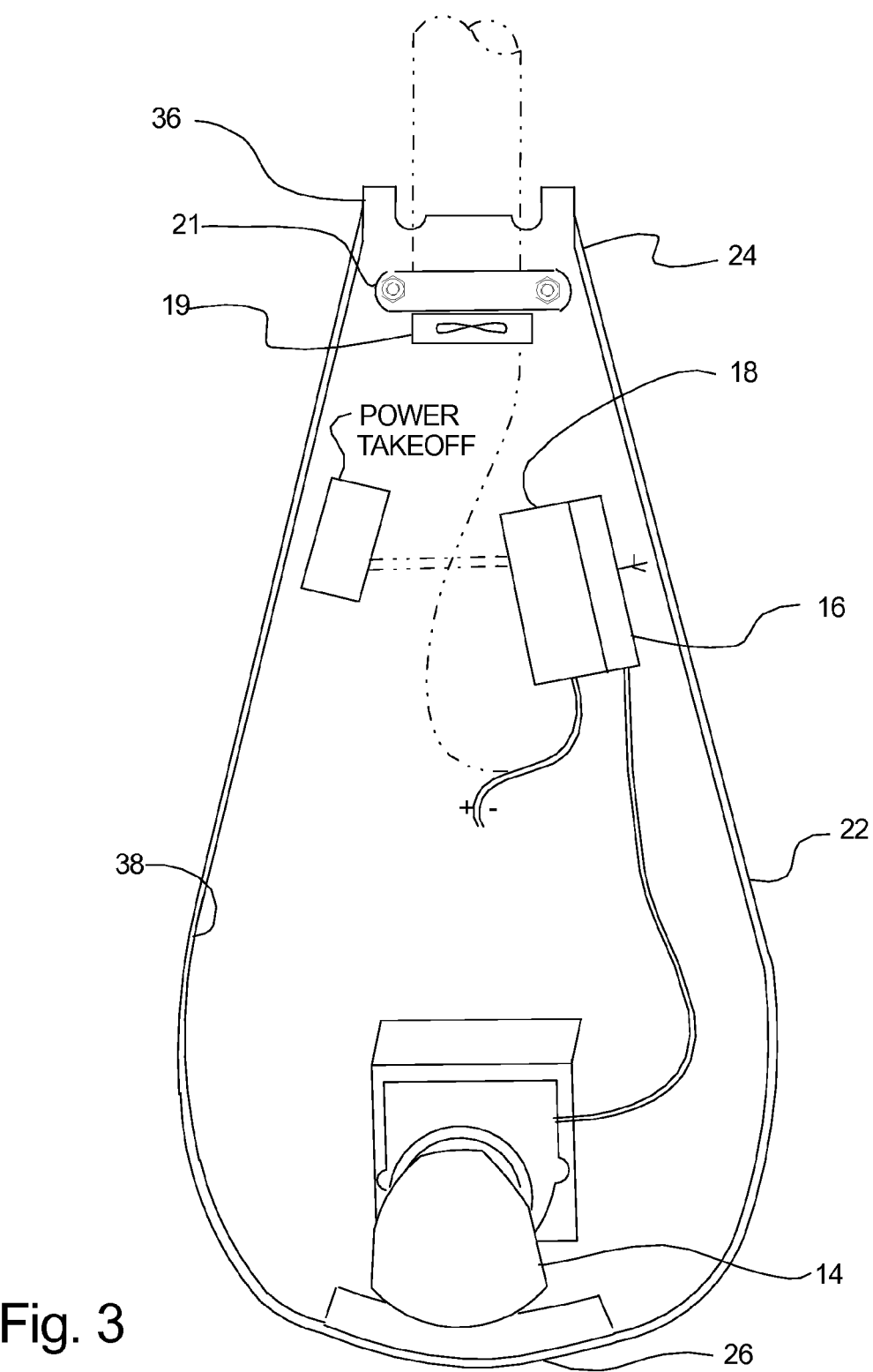
FIG. 3 is a view looking at the top housing when the lower housing has been opened or removed, the view illustrating the arrangement of the modem or transceiver device and the use of existing power supply lugs to power the camera and modem.

Turning to FIGS. 1 and 3 it will be understood that a cobra-style streetlight housing 10 incorporating the inventive aspects disclosed here is particularly useful for taking surveillance video data from a high vantage point by mounting the disclosed cobra-style streetlight housing 10 from a telephone pole 12, or dedicated streetlight pole. Cobra-style streetlight fixtures, such as the fixture disclosed in U.S. Pat. No. 3,065,338 to Husby et al. ("Husby"), which has been incorporated herein by reference, have been adopted by numerous municipalities throughout the country, and thus provide an excellent platform for housing surveillance equipment. However, the design of these streetlight fixtures does not leave adequate space within the housings to allow the placement of a surveillance camera 14, along with the components needed for communicating with an controlling the camera 14, equipment such as a wireless modem 16 and a transformer 18 for providing the needed voltage to the camera 14 and the modem 16 or transceiver. Still further, as can be appreciated from the embodiment illustrated In FIG. 1 of the Husby disclosure, the reflector and the large light bulb commonly used with these streetlights also contribute to the problem of having virtually no space for concealing a surveillance system within the fixture's housing.

As can be understood from FIGS. 1-6, the disclosed invention uses a camouflaged generally extended asymmetrical mandorla shaped lens 20 to convert the cobra-style streetlight housing 10 into a housing that can accommodate the surveillance camera 14 and the associated modem 16 and transformer 18, or power source. It is important to note that, as illustrated in FIG. 9, while the preferred embodiment of the invention uses a one-piece mandorla shaped lens 20, it is contemplated that the narrower end portions 21 may be of a completely opaque material, while the middle portion 23 is of a transparent material coated with a one-way transparent material, such as the perforated vinyl wrap material sold under the trademark Scotchcal by the Minnesota Mining and Manufacturing Company of St. Paul, Minn. The preferred embodiment of the invention is made of a one-piece section of transparent material that is coated with perforated vinyl, tinted material, or may simply be an uncoated section of tinted lens material. Additionally, it will be understood that when a streetlight housing is converted using the principles disclosed here, the cobra-style streetlight housing 10 will also allow the use of a camera 14 that can pan tilt and zoom to view much of the ground area below and to the sides of the camera 14.

Figure 2:
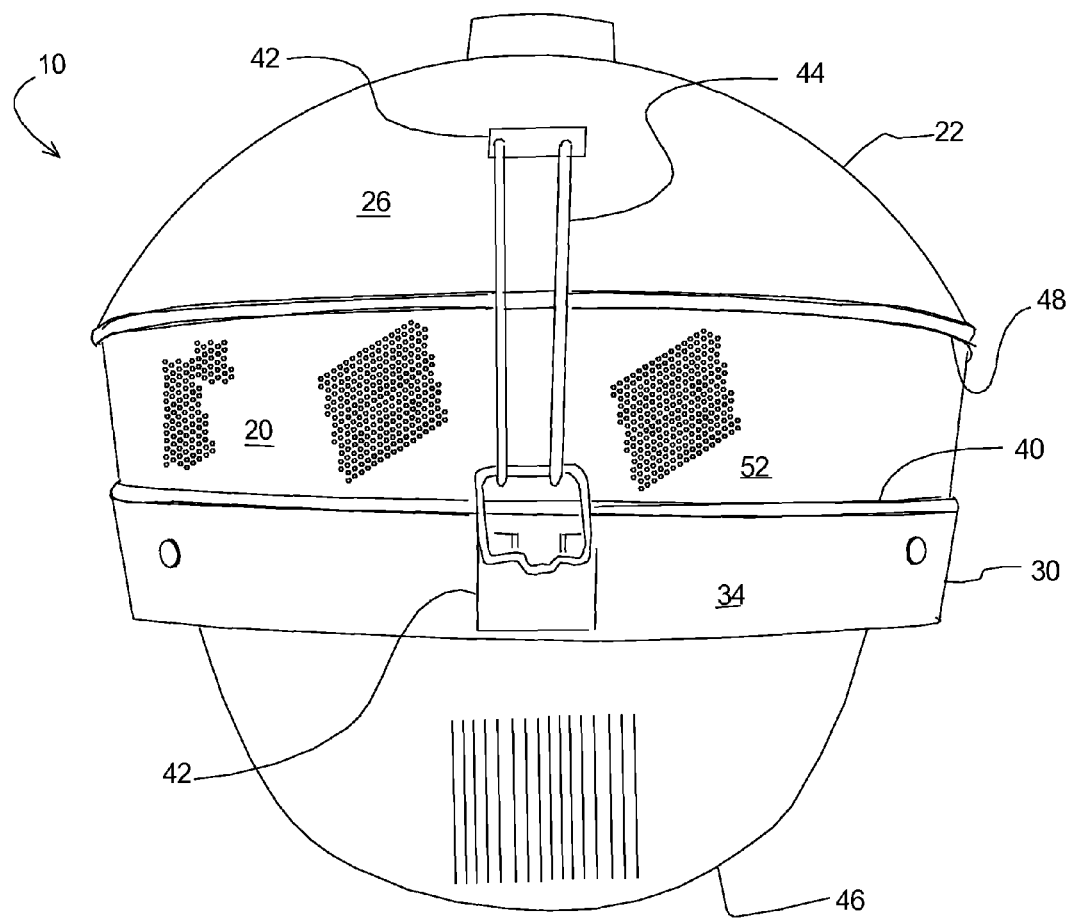
FIG. 2 is a view looking at the front of cobra-style lighting fixture, and illustrating the disclosed invention, incorporating the camouflaged lens and extended latch mechanism used with the disclosed invention.

Referring to FIGS. 2-3 and 4 it will be understood that the disclosed invention uses a concave upper housing 22 having an upper housing first end 24 and an upper housing second end 26, the upper housing first end being adapted for attachment and support of the cobra-style streetlight housing 10 from the streetlight support pole 28, which is in turn supported from the telephone pole 12.

Supported from the concave upper housing 22 is a concave lower housing 30, such as the example illustrated in FIG. 4. The lower housing 30 includes a lower housing first end 32 and a lower housing second end 34. The lower housing second end 34 is connected to the upper housing second end 26 through a hinge connection 36, illustrated in FIGS. 4 and 5. The hinge connection 36 allows movement of the lower housing relative to the upper housing 22, to allow for maintenance of the internal components of the cobra-style streetlight housing 10. FIGS. 2-3 and 4 also illustrate that the upper housing 22 terminates in an upper housing lower rim 38, and that the lower housing 30 terminates in a lower housing upper edge 40 that mates with the upper housing lower rim 38. Additionally, FIG. 2 illustrates that the upper housing first 24 and the lower housing first end 32 include a latch support 42 that is used to support a latch 44 that extending between the upper housing lower rim 38 and the lower housing upper edge 40. Additionally, a diffuser lens 46, which can be of the "bubble" or domed type, as illustrated in FIGS. 2 and 6, or generally flat lens, which may be a stack of a flat lens and a diffuser lens or a one-piece diffuser lens, as illustrated in FIG. 5. The diffuser feature improves the emulation of the original light bulb, while using LEDs instead of the original bulb. LEDs are used due to their reduced size, lower power consumption, and reduced heat emission. However, it is contemplated that the disclosed invention will still use a fan to keep the components of the disclosed system at a desired operating temperature, despite the reduction in heat generated through the use of LEDs. It is contemplated that the fan 19 would be located near the mounting bracket 21, as illustrated in FIG. 3.

Thus, as can be understood from FIGS. 1, 4-5, and 6, the mandorla shaped lens 20 is positioned between the upper housing lower rim 38 and the lower housing upper edge 40 though the retaining action of the latch 44, which is preferably positioned between the concave upper housing second end 26 and the lower housing second end 34. According to a preferred embodiment of the invention, the generally extended asymmetrical mandorla shaped lens 20 is asymmetrical in that it has an edge that follows the upper housing lower rim 38 and an edge that follows the lower housing upper edge 40, and that because the upper housing lower rim 38 is pivoted away from the upper housing lower rim 38 in order to fit the mandorla shaped lens 20, the edge of this lens that follows the lower housing upper edge 40 is not the necessarily the same as the edge that follows the upper housing lower rim 38. As shown in FIG. 4, the mandorla shaped lens 20 is preferably fastened to the interior 41 of the concave lower housing 30 through fasteners, such as fasteners 43, which in a preferred embodiment are bolts that extend through the mandorla shaped lens 20 and into the concave lower housing 30.

Additionally, the mandorla shaped lens 20 has an internal side 50 and an external side 52, the external side being coated with a micro perforated material that present an opaque appearance when viewed from the external side, but which is transparent in appearance when viewed from the internal side. This arrangement will allow the camera 14 supported from inside the modified cobra-style streetlight housing and used for surveillance purposes while enclosed within the housing. The mandorla shaped lens 20 is referred to herein as being "camouflaged" because it is preferred that the external side 52 of this lens be colored or coated with an image that matched the external coloration or surface of the concave upper housing 22 or the concave lower housing 30, and thus making any modification to the cobra-style streetlight housing inconspicuous.

Turning now to FIGS. 7, 8A and 8B, it will be understood that an adaptor housing 56 will preferably be used with the disclosed invention. The adaptor housing 56 will replace the light bulb commonly used in the streetlight, and leave a separate space for the camera 14 between the adaptor housing 56 and the second end 26 of the upper housing 22. The adaptor housing 56 is used to replace the original light bulb used with the cobra-style streetlight with an LED based illumination system, using known LED systems such as those discussed in U.S. Patent Application Publication 2011/0134239 to Vadai et al, incorporated herein by reference. In a preferred example of the invention strips containing LEDs of various colors are used to create light emissions that emulate the spectrum of light provided by the light bulb being replaced. The adaptor in the disclosed invention is designed to provide additional space near the second end of the concave upper housing 22 for the surveillance camera, while serving as an illumination source. The LEDs used with the disclosed invention will be supported from an inverted concave reflector 58 that will support the LEDs.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

I claim:

1. A cobra-style streetlight housing for accepting a surveillance camera while the housing is supported from a streetlight support pole, the housing comprising:
 a streetlight housing comprising:
  a concave upper housing having an upper housing first end and an upper housing second end, the upper housing first end being adapted for attachment to the streetlight support pole;
  a concave lower housing, the lower housing having a lower housing first end and a lower housing second end, the lower housing second end being connected to the upper housing second end through a hinge connection that allows movement of the lower housing relative to the upper housing, the lower housing supporting a diffuser lens, the upper housing terminates in an upper housing lower rim and the lower housing terminating in a lower housing upper edge that mates with the upper housing lower rim, the housing further comprising a latch support;
 a camouflaged lens having a generally extended asymmetrical mandorla shape, the camouflaged lens; and
 a latch mounted to the latch support, the latch extending between the upper housing lower rim and the lower housing upper edge, so that the camouflaged lens extends between the upper housing lower rim and the lower housing upper edge while the latch retains the lower housing upper edge against the camouflaged lens and retains the camouflaged lens against the upper housing lower edge, so that surveillance equipment may be housed within cobra-style streetlight housing and surveillance video captured through the camouflaged lens.

2. A cobra-style streetlight housing according to claim 1 and further comprising an illumination source having an inverted concave reflector that is supported from the concave lower housing, and a surveillance camera positioned between inverted concave reflector and the upper housing second end, so that the surveillance camera may collect image data through the camouflaged lens.

3. A cobra-style streetlight housing according to claim 2 wherein the external side of said camouflaged lens is colored to match an external surface of the concave upper housing.

4. A method for incorporating surveillance capabilities into a cobra-style streetlight housing, the method comprising:
 providing a streetlight housing comprising:
  a concave upper housing having an upper housing first end and an upper housing second end;
  a concave lower housing, the lower housing having a lower housing first end and a lower housing second end, the lower housing second end being connected to the upper housing second end through a hinge connection that allows movement of the lower housing relative to the upper housing, the lower housing supporting a diffuser camouflaged lens, the upper housing terminates in an upper housing lower rim and the lower housing terminating in a lower housing upper edge that mates with the upper housing lower rim, the housing further comprising a latch support;
 providing a camouflaged lens having a generally extended asymmetrical mandorla shape; and
 providing a latch mounted to the latch support, and inserting the camouflaged lens between the upper housing lower rim and the lower housing upper edge and retaining the camouflaged lens between the upper housing lower rim and the lower housing upper edge, so that the lower housing first end is supported from the upper housing first end.

* * * * *